S. R. MUNSON.
GAME TRAP.
APPLICATION FILED JUNE 5, 1912.

1,073,923.

Patented Sept. 23, 1913.

WITNESSES:
F. A. Carlson
Mary E. Fuller.

INVENTOR:
Samuel R. Munson,
BY
Beach & Fisher
ATTORNEYS.

UNITED STATES PATENT OFFICE.

SAMUEL R. MUNSON, OF NEW HAVEN, CONNECTICUT, ASSIGNOR TO SARGENT & COMPANY, OF NEW HAVEN, CONNECTICUT, A CORPORATION OF CONNECTICUT.

GAME-TRAP.

1,073,923.  Specification of Letters Patent.   Patented Sept. 23, 1913.

Application filed June 5, 1912.  Serial No. 701,868.

*To all whom it may concern:*

Be it known that I, SAMUEL R. MUNSON, a citizen of the United States, residing in New Haven, county of New Haven, and State of Connecticut, have invented certain new and useful Improvements in Game-Traps, of which the following is a full, clear, and exact description.

This invention relates to game traps, and particularly to the trigger mechanism of such devices.

Usually, one of the jaws of the trap is held open by means of a pivoted detent (generally carried by a fixed part on the base of the trap) coöperating with a trip lever, or equivalent device, to which the bait pan is secured, and on which such bait pan is supported. The pivoted detent or trigger, when set, or when being set, is usually so loosely placed with respect to the catch of the trip lever, in the ordinary forms of game traps, that it is very apt to be released accidentally while still in the hands of the trapper; or, on the other hand, if the detent tightly fits its pivotal support, it cannot be easily manipulated and a special, rather expensive mounting for the detent is necessitated.

The object of the present invention is to obviate these defects, and to provide a detent mounting which will absolutely prevent lateral and longitudinal movement of the detent when set, but which will, nevertheless, permit the detent to be mounted on its support in an extremely simple and inexpensive manner, and allow it a free swinging movement when released.

To these and other ends, the invention consists in the novel features to be hereinafter described and claimed.

Figure 1:
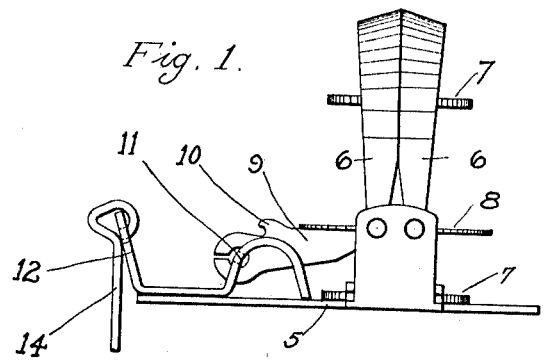
Figure 2:
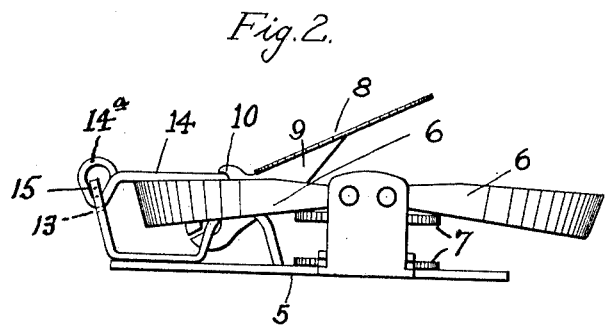
Figure 3:
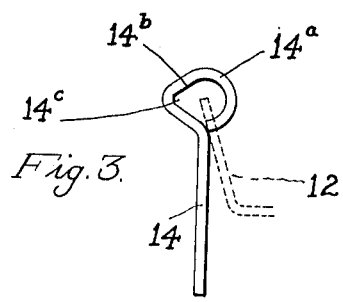
Figure 4:
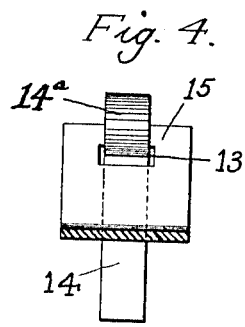

In the accompanying drawing, Figure 1 is an end elevation of a trap embodying the invention, showing the trap in its normal position, Fig. 2 is a similar view, showing the trap in its set position, Fig. 3 is a detail edge view of the detent, and Fig. 4 is a detail face view of the detent mounting.

Referring to the drawing, the base of the trap is shown at 5, and said base carries pivoted jaws 6, controlled by a spring 7 of suitable form. The bait pan 8 is mounted on a trip lever 9 having a trigger catch 10, and pivoted at 11 to a suitable support on the base 5. Extending upward from one side of the base is a lug 12, having near its upper end an elongated horizontal slot 13 in which fits a loop 14$^a$ of a detent or trigger 14.

The detent 14 is preferably formed of a flat bar of metal presenting a straight shank from which the loop 14$^a$ is bent at one end in the form of an eye. The slot 13 is preferably of considerably greater width than the thickness of the trigger eye or loop, and it is somewhat longer than the eye or loop, in order that the trigger may have a free pivotal movement on the pivot formed by the upper edge portion 15 of the lug 12.

If the eye or loop 14$^a$ were of the ordinary circular shape, a mounting of great simplicity, durability and strength would be provided, but there would be considerable difficulty in positioning the free extremity of the detent with respect to the catch 10 of the trip lever with the required degree of accuracy. If the round eye had sufficient play on its pivot to permit a free swinging movement of the detent when released, it would also permit a lateral shifting movement of the detent when set, or when being set, and this would manifestly be a great disadvantage as the trap would be very likely to be sprung while being set by the operator. In order to avoid this disadvantage, I do not form the eye 14$^a$ as an approximation of a circle, but give it at one side, as shown at 14$^b$, the shape of a sharp V. This provides a sharply defined notch or seat 14$^c$ in the eye. When the trap is set, as shown in Fig. 2, this notch or seat will be engaged with the under surface of the pivot portion or bar 15, and the converging walls of the eye or loop located at opposite sides of the notch or seat 14$^c$ will effectively prevent any movement of the trigger 14 in a longitudinal direction, *i. e.*, laterally with respect to the trap and the notch 10. The engagement of the notch or seat 14$^c$ with the upper edge of the slot 13 throughout the width of the detent bar also prevents twisting movement of the detent or movement laterally of its axis.

It is, of course, understood that the firm positioning of the notch or seat 14$^c$ on the edge of the bar 15 is due to the lifting action of the spring 7, on that jaw 6, which fits between the detent 14, as shown in Fig. 2, and lifts said detent as high as is permitted by the catch 10. The loop or eye portion of the detent will be pushed upward strongly by the spring-pressed jaw, thereby positioning the V-shaped portion of the detent eye against the abutment or pivot 15 of the lug 12. When the trap is in its normal position, however, the detent 14 will obviously have a free swinging movement with respect to its pivotal support.

Without limiting myself to the construction shown, I claim:

In a game trap, the combination of a base; a pair of spring pressed jaws mounted on said base, a bait pan, a trip device carried by said bait pan, a lug or post extending upward from the base and provided with a slot having its upper edge directed transversely of said lug, and a detent member pivoted to said lug and adapted to coöperate with said trip device in confining one of said jaws, said detent comprising a bar having a wide loop passing loosely through said slot and embracing the upper end portion of said lug, said loop having a V-shaped portion or seat which is pressed by said jaw into engagement with the upper edge of said slot substantially throughout the width of the loop; substantially as described.

In witness whereof, I have hereunto set my hand on the 3rd day of June, 1912.

SAMUEL R. MUNSON.

Witnesses:
CALVIN HARDING,
ARTHUR L. HILLS.